(12) United States Patent
Davis

(10) Patent No.: US 12,151,841 B2
(45) Date of Patent: Nov. 26, 2024

(54) PACKAGING MACHINE CUP AND LID SEALING ASSEMBLY AND CUP SEALING ASSEMBLY

(71) Applicant: Winpak Lane, Inc., Rialto, CA (US)

(72) Inventor: Steven Davis, Rialto, CA (US)

(73) Assignee: Winpak Lane, Inc., Rialto, CA (US)

( * ) Notice: Subject to any disclaimer, the term of this patent is extended or adjusted under 35 U.S.C. 154(b) by 73 days.

(21) Appl. No.: 17/992,768

(22) Filed: Nov. 22, 2022

(65) Prior Publication Data
US 2024/0166393 A1   May 23, 2024

(51) Int. Cl.
*B65B 51/14* (2006.01)
*B65B 7/28* (2006.01)
*B65B 51/32* (2006.01)

(52) U.S. Cl.
CPC ............ *B65B 51/14* (2013.01); *B65B 7/2878* (2013.01); *B65B 51/32* (2013.01)

(58) Field of Classification Search
CPC ....... B65B 7/2878; B65B 51/14; B65B 51/32; B65B 51/10; B65B 7/164; B65B 2051/105; B65B 25/008; B65B 31/00; B65B 31/028; B65B 51/22; B29C 66/8322; B29C 65/18; B29C 66/131; B29C 66/112; B29C 66/53461; B29C 66/8161; B29C 66/8242; B29C 66/8163
See application file for complete search history.

(56) References Cited

U.S. PATENT DOCUMENTS

2020/0180234 A1*  6/2020  Scrivani ................ B29C 66/131
2022/0289418 A1*  9/2022  Snyder .................... B29C 65/30

\* cited by examiner

*Primary Examiner* — Veronica Martin
(74) *Attorney, Agent, or Firm* — The Watson IP Group, PLC; Jovan N. Jovanovic

(57) ABSTRACT

A cup sealing assembly comprising a lower housing member, an upper housing member, a lower housing plate, a heater plate, and a heating element. The lower housing member has a lower wall. A central wall extends across the lower wall. A cooling slot is defined in the lower wall. The upper housing member has an upper wall and an upper transverse wall, and is positioned on the central wall. A pair of cooling slots is defined in the upper wall in a vertical orientation. The lower housing plate is positioned at a lower end of the lower housing member. The heater plate has an outer rim from its lower surface. The heating element is sandwiched between the heater plate and the lower housing plate. The heater plate fastener couples the lower housing member to the heater plate. An assembly having multiple cup sealing assemblies is disclosed.

22 Claims, 11 Drawing Sheets

PACKAGING MACHINE CUP AND LID SEALING ASSEMBLY AND CUP SEALING ASSEMBLY

CROSS-REFERENCE TO RELATED APPLICATION

N/A

BACKGROUND OF THE DISCLOSURE

1. Field of the Disclosure

The disclosure relates in general to packaging equipment, and more particularly, to a packaging machine cup and lid sealing assembly and a cup sealing assembly.

2. Background Art

The packaging of sauces, dressings, syrups and the like is often accomplished through the use of cups that have a heat sealed lid extending thereacross. Such packaging has become very popular, especially due to the significant increase in take out and to go food options. Such packaging is likewise utilized for larger items, such as yogurt, apple sauce, gelatins, pudding and the like.

Such packaging typically includes a base cup of varying size with an opening at the upper end thereof. The cup may have any one of a number of different configurations, shapes and capacities. Across the top, a lid provides a seal to the opening. The lid may be formed from a film that may include metal layers, metallized layers, and polymer layers. Typically, the lid is heat sealed to the upper rim of the cup.

With the ever increasing outputs and the like, it is desirable to increase the speed at which such cups and lids are formed, filled and sealed. One step that has been a focus of improvement is the time taken to form the seal of the lid to the cup. There has been a desire to increase the temperature of the elements to effectuate improvements to the seal.

Problematically, such increases in temperature and other changes (i.e., changes in the forces applied, the speed of the machine, among others), the heating elements and other equipment associated with the seal forming process is subject to more difficult operating environments. For example, the force absorbing springs and other components are subject to fatigue at elevated temperatures, which can greatly impact the life of such components. Additionally, many components either lack adequate strength at elevated temperatures or lack the ductility necessary for use in this application.

SUMMARY OF THE DISCLOSURE

The disclosure is directed a cup sealing assembly comprising a lower housing member, an upper housing member, a heater plate and a heating element. The lower housing member has a lower wall defining a cavity. A plurality of cooling slots extend through the lower wall providing ingress into the cavity. The lower wall has a lower end and an upper end. A central wall extends across the upper end of the central wall and has a central opening. The upper housing member has an upper wall including an upper end, and a lower end. An upper transverse wall extends across the upper end of the upper wall, with a lower flange defined at the lower end, the flange overlying the central wall. A lower overhang portion overlies a portion of an outer surface of the lower wall. The heater plate extends across the lower end of the lower housing member. The heater plate has an upper surface and a lower surface with an outer rim. The outer rim is configured to form a seal between a lid and a cup of a container. The heating element engages the upper surface of the heater plate.

In some configurations, the upper wall of the upper housing member has a plurality of lower slots and upper slots spaced apart and above the lower slots. In some configurations, the plurality of lower slots are formed into the lower flange and lower overhang portion. In some configurations, the lower slots and the upper slots each comprise three lower slots and three upper slots that correspond to the three lower slots.

In some such configurations, the upper and lower slots of the upper housing member are substantially horizontal with the cooling slots being substantially vertical.

In some configurations, the assembly further comprises at least one opening extending through the lower overhang portion. At least one corresponding threaded bore extends in the lower wall of the lower housing member, and, a fastener extends through the opening and into the corresponding threaded bore.

In some configurations, the assembly further comprises at least one fastener that joins the central wall of the lower housing member to the heater plate.

In some such configurations, the lower housing member further includes a connector tube extending from the central wall opposite the lower wall.

In some such configurations, the heating element extends through the connector tube.

In some configurations, the assembly further comprises a sensor extending through the upper transverse wall and the central wall and including a sensor tip proximate the heater plate.

In some configurations, the heater plate and the heating element are unitized.

In another aspect of the disclosure, the disclosure is directed to a cup sealing assembly comprising a lower housing member, an upper housing member, a lower housing plate, a heater plate, a heating element and at least one heater plate fastener. The lower housing member has a lower wall having a lower end and an upper end. A central wall extends across the upper end of the lower wall defining a cavity. At least one cooling slot is defined in the lower wall providing ingress into the cavity. The upper housing member has an upper wall and an upper transverse wall. The upper wall has a lower end positioned on the central wall, defining an upper cavity. At least one pair of cooling slots defined in the upper wall the pair of cooling slots being spaced apart from each other in a vertical orientation. The lower housing plate is positioned at a lower end of the lower housing member. The heater plate has an upper surface and a lower surface, with an outer rim extending from the lower surface. The heating element is sandwiched between the upper surface of the heater plate and the lower surface of the lower housing plate. The at least one heater plate fastener couples the lower housing member to the heater plate, and extends through the lower housing plate.

In some configurations, the central wall includes a central opening. The upper transverse wall includes a central opening and the lower housing plate includes a central opening. A portion of the heating element extends through the central opening of the central wall, the central opening of the upper transverse wall and the central opening of the lower housing plate.

In some configurations, the lower housing member includes a connector tube extending from the central opening of the central wall and through the central opening of the upper transverse wall.

In some configurations, the lower end of the upper wall includes a lower flange engaging the central wall, with an overhanging portion extending over a portion of an outer surface of the lower housing member.

In some configurations, the assembly further comprises a fastener extending through the overhanging portion of the upper wall and into the lower housing member, to, in turn, couple the upper housing member to the lower housing member.

In some configurations, the assembly comprises a sensor having a sensor tip interfacing with a top surface of the lower housing plate.

In some configurations, the upper surface of the heater plate includes a heating element groove defined therein. The heating element including a lower coil configured to be positioned within the heating element groove.

In some configurations, the at least one slot of the lower housing member comprises a plurality of vertically oriented slots spaced apart from each other about the lower wall. The plurality of pairs of vertically oriented slots extend through the upper wall comprises a plurality of pairs of vertically oriented slots extend through the upper wall, each pairs of vertically oriented pairs of slots having an elongated horizontally oriented slot.

In some configurations, the assembly further comprises at least one fastener coupled to the upper transverse wall with a spring captured between the at least one fastener and the upper transverse wall.

In some configurations, the lower housing plate, the upper housing member and the lower housing member comprises a 304 stainless steel material, and the heater plate comprises a 404c stainless steel material.

In another aspect of the disclosure, the disclosure is directed to a packaging machine cup and lid sealing assembly comprising a housing and a plurality of cup sealing assemblies. Tach of the plurality of cup sealing assemblies is attached to the housing through a coupling. The coupling comprises at least one fastener, with a spring biasing the cup sealing assembly relative to the housing and the at least one fastener. At least one of the the plurality of cup sealing assemblies being of the type described hereinabove and hereinbelow.

BRIEF DESCRIPTION OF THE DRAWINGS

The disclosure will now be described with reference to the drawings wherein.

DETAILED DESCRIPTION OF THE DISCLOSURE

Figure 1:
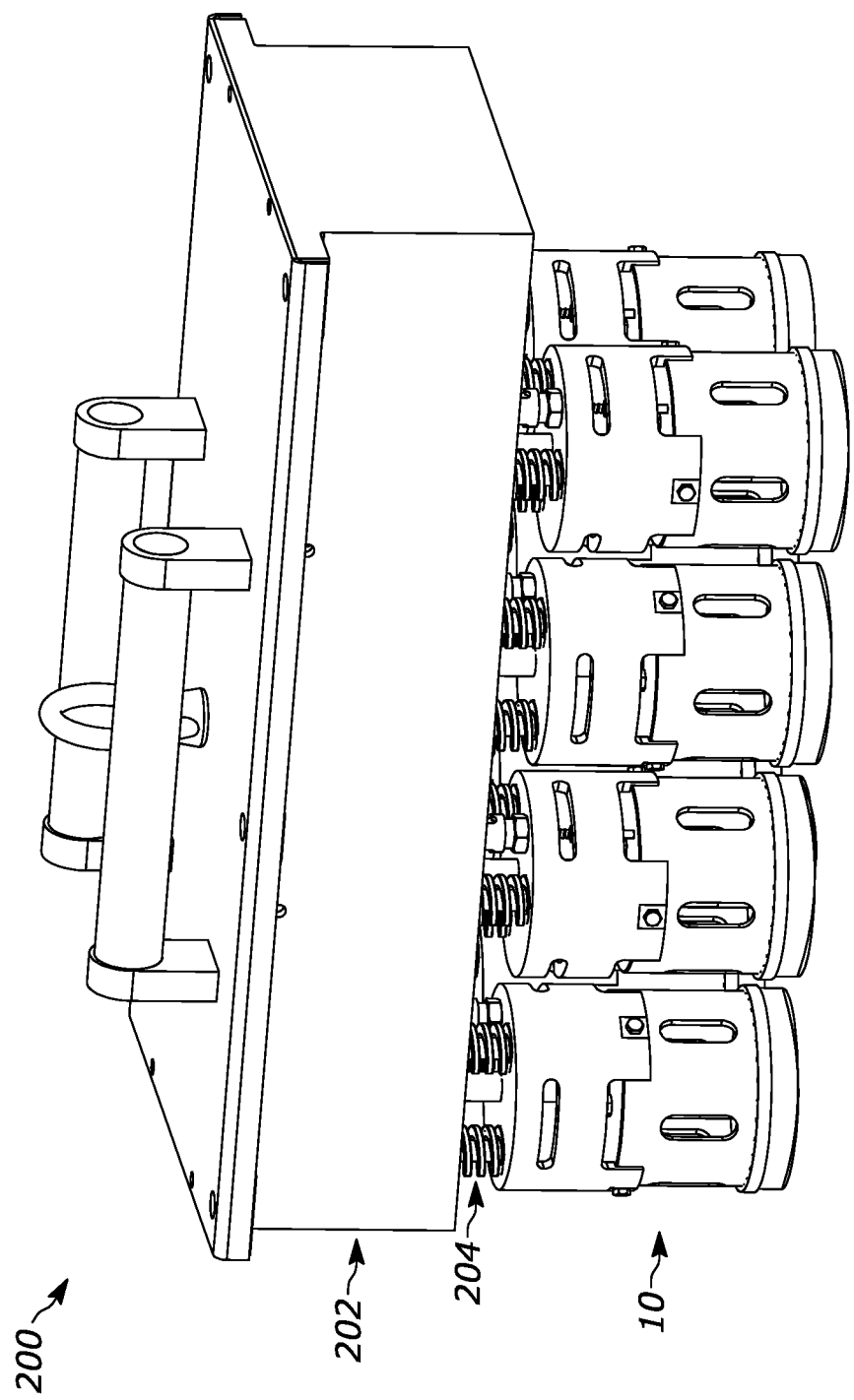
FIG. 1 of the drawings is a top perspective view of a packaging machine cup and lid sealing assembly, showing, in particular, a plurality of cup sealing assemblies coupled thereto.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 2:
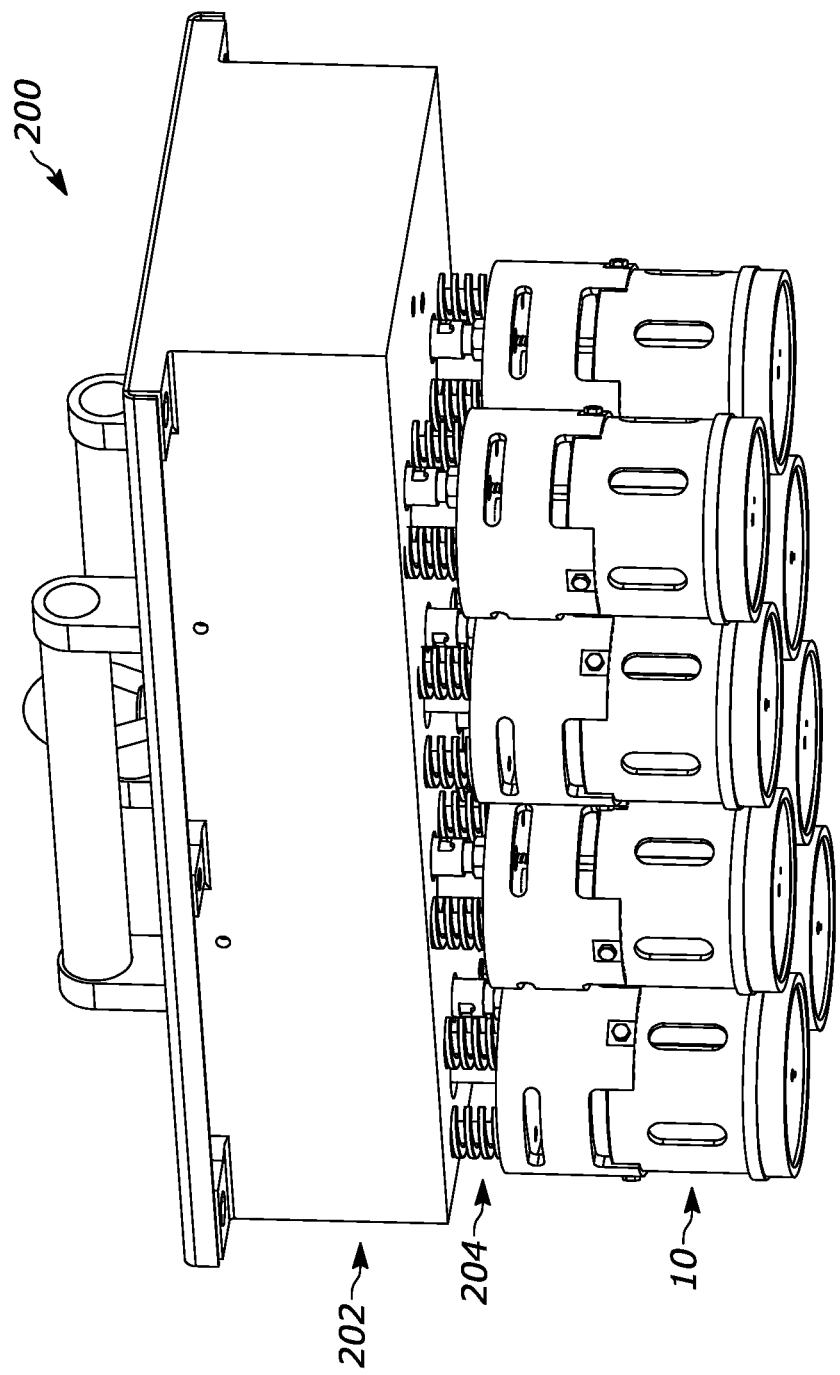
FIG. 2 of the drawings is a bottom perspective view of a packaging machine cup and lid sealing assembly, showing, in particular eight of the cup sealing assemblies coupled to the housing of the assembly.
Figure 3:
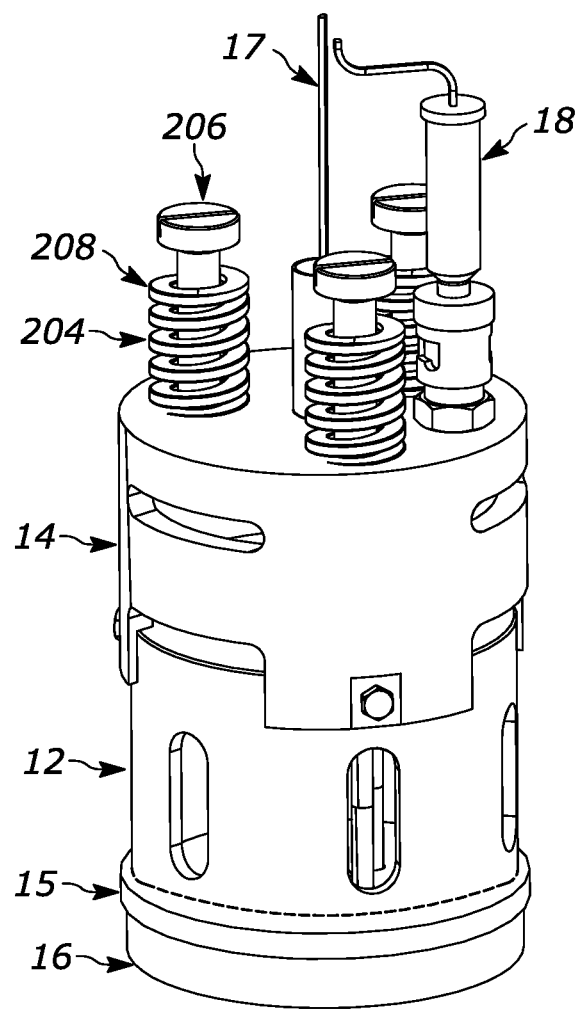
FIG. 3 of the drawings is a perspective view of the cup sealing assembly of the present disclosure, showing, in particular, couplings that include springs and fasteners which are utilized to couple the cup sealing assembly to the housing of the overall assembly.
Figure 12:
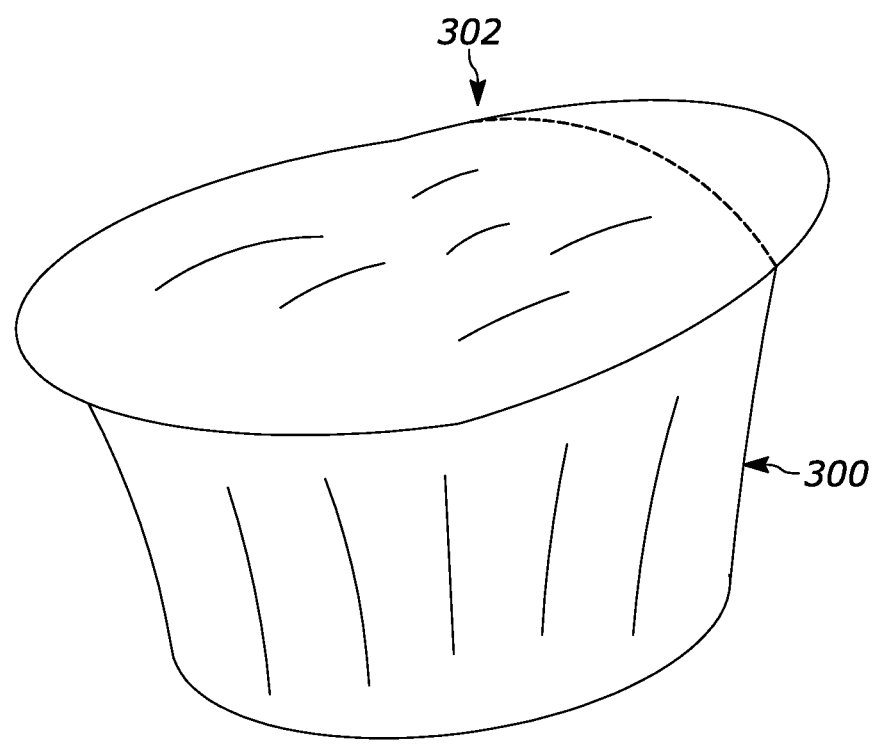
FIG. 12 of the drawings is a perspective view of an exemplary cup and an exemplary lid of the type that may be sealed to the exemplary cup, with the understanding that many different configurations of each are contemplated.

Referring now to the drawings and in particular to FIGS. 1 and 2, the packaging machine cup and lid sealing assembly is shown generally at 200 (hereinafter assembly 200). It will be understood that the assembly 200 is used in conjunction with a filler so as to seal a lid 302 (FIG. 12) onto a cup 300 (FIG. 12) filled with a desired flowable material (which may comprise a liquid, solid, gel, and which may include granular materials, syrups, condiments, sauces, creams, dressings, among others). Indeed, there is no particular limitation to the materials with which the cup may be filled. The assembly 200 includes a plurality (in this case eight) cup sealing assemblies 10 attached to a housing 202 in a slidable manner by coupling 204. With further reference to FIG. 3, the coupling 204 comprises at least one fastener 206 (and in the configuration shown three). The fasteners are threaded into the cup sealing assembly and which are slidably associated with the housing 202. A spring, such as spring 208 biases the cup sealing assembly away from the housing 202, as the spring is captured between the fastener and the upper transverse wall. It will be understood that a greater number or a fewer number of cup sealing assemblies may be employed. Additionally, a packaging machine may include multiple assemblies such as assembly 200.

Figure 4:
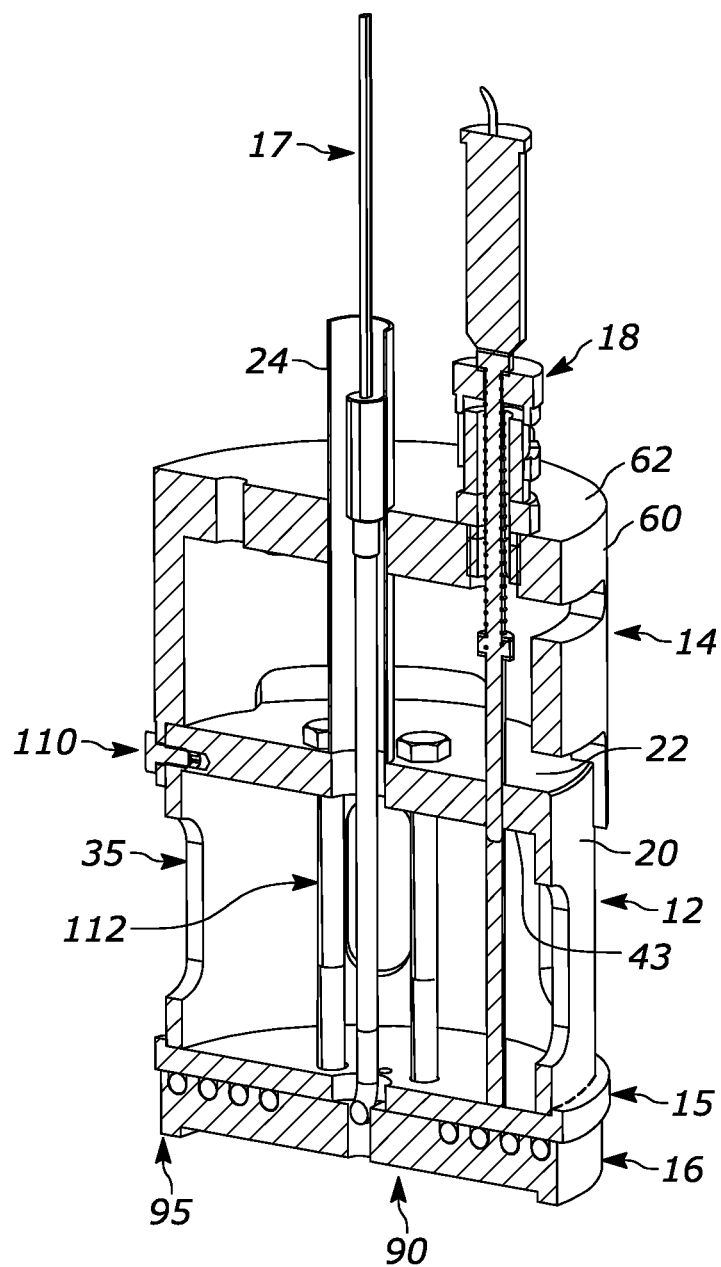
FIG. 4 of the drawings is a cross-sectional perspective view of the cup sealing assembly of the present disclosure.
Figure 5:
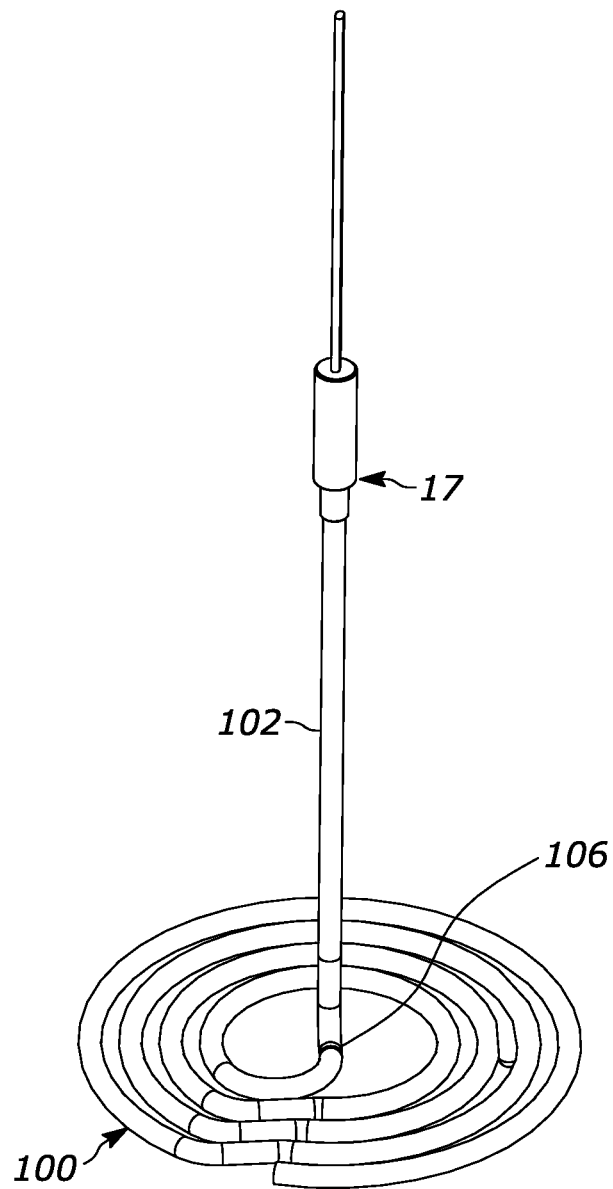
FIG. 5 of the drawings is a perspective view of the heating element.
Figure 6:
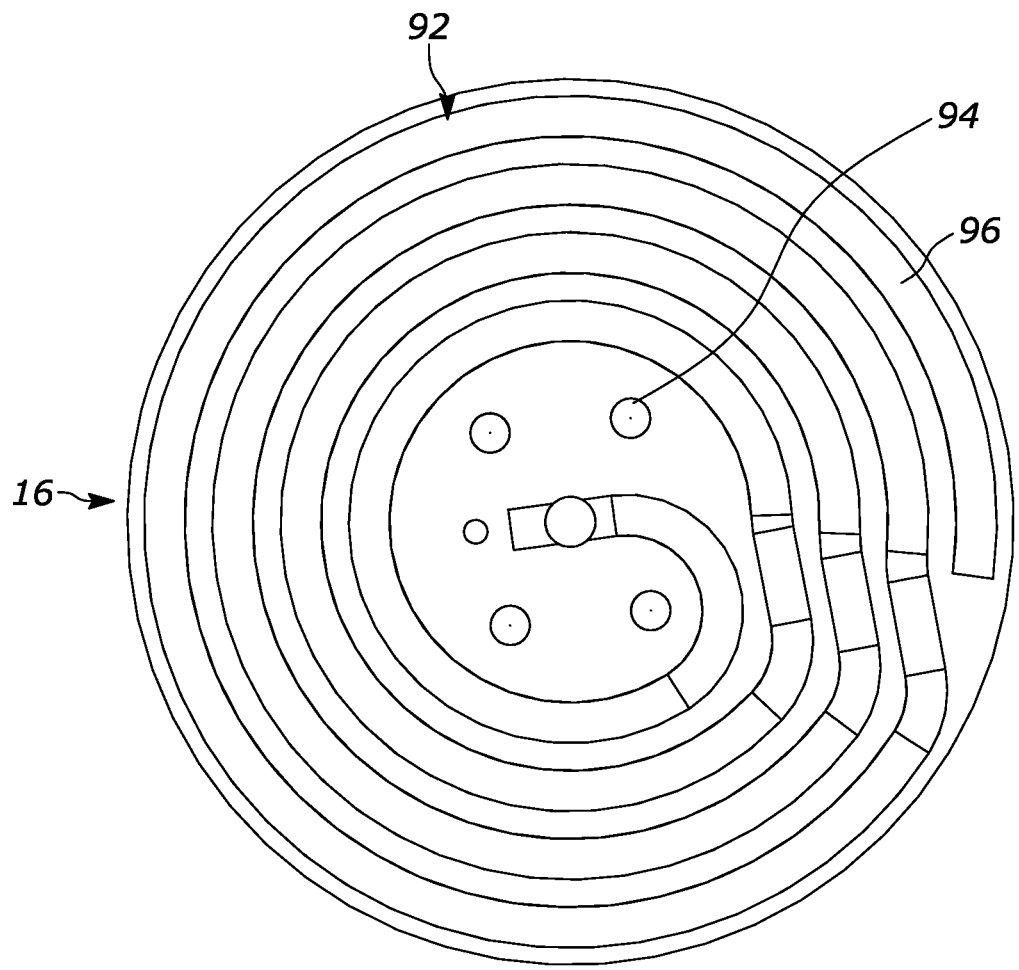
FIG. 6 of the drawings is a top plan view of the heater plate, showing, in particular, the upper surface thereof, and the heating element groove.
Figure 7:
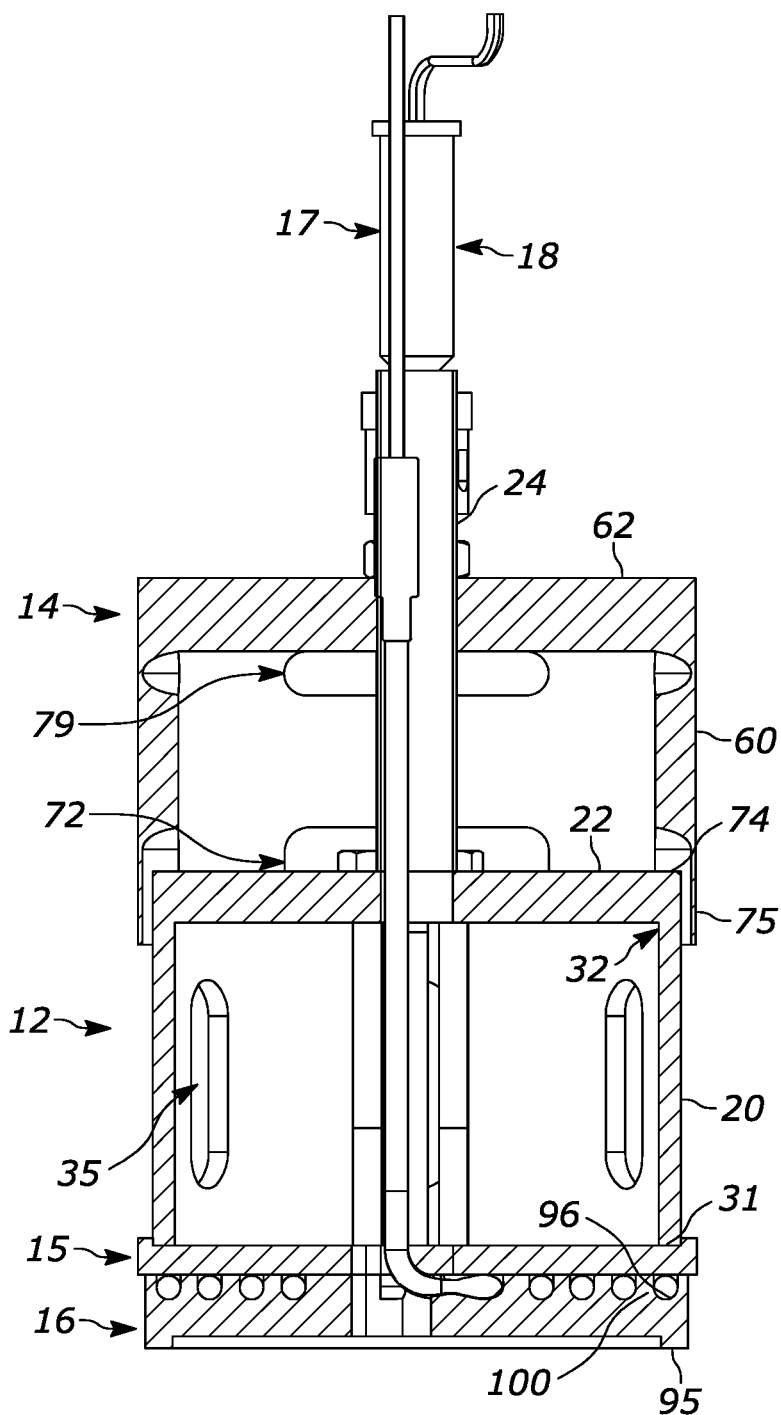
FIG. 7 of the drawings is a cross-sectional view of the cup sealing assembly of the present disclosure.
Figure 8:
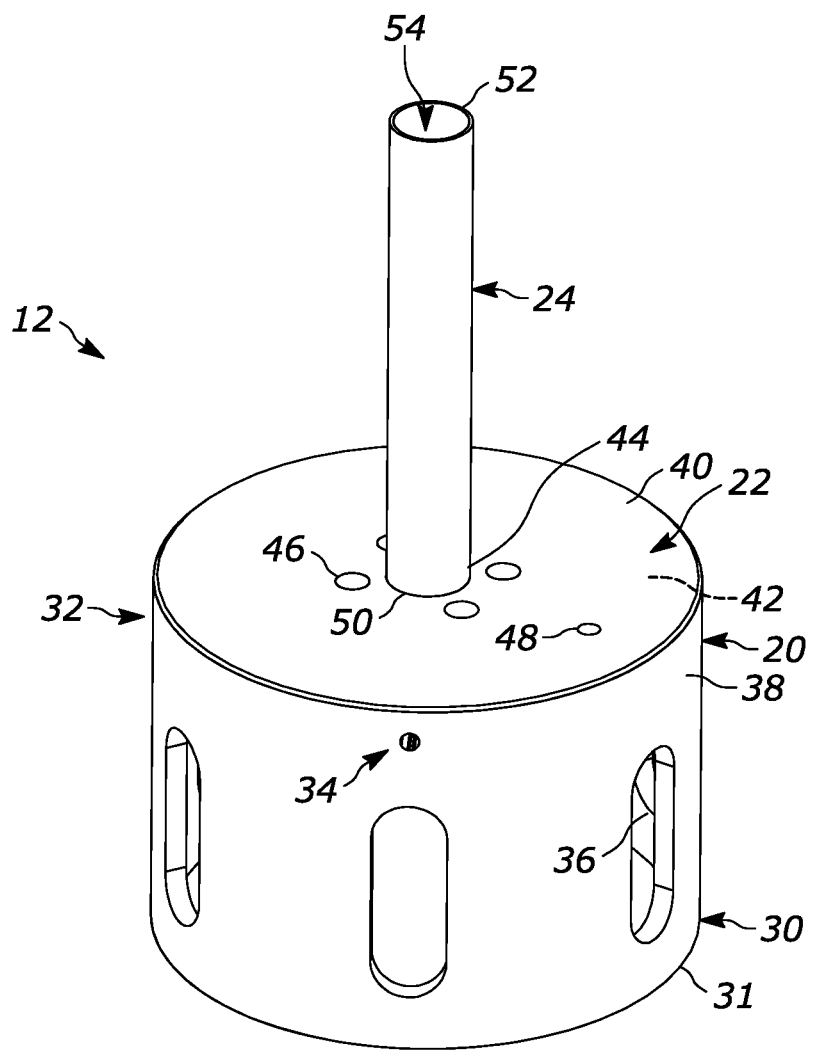
FIG. 8 of the drawings is a perspective view of the lower housing member of the cup sealing assembly of the present disclosure.
Figure 9:
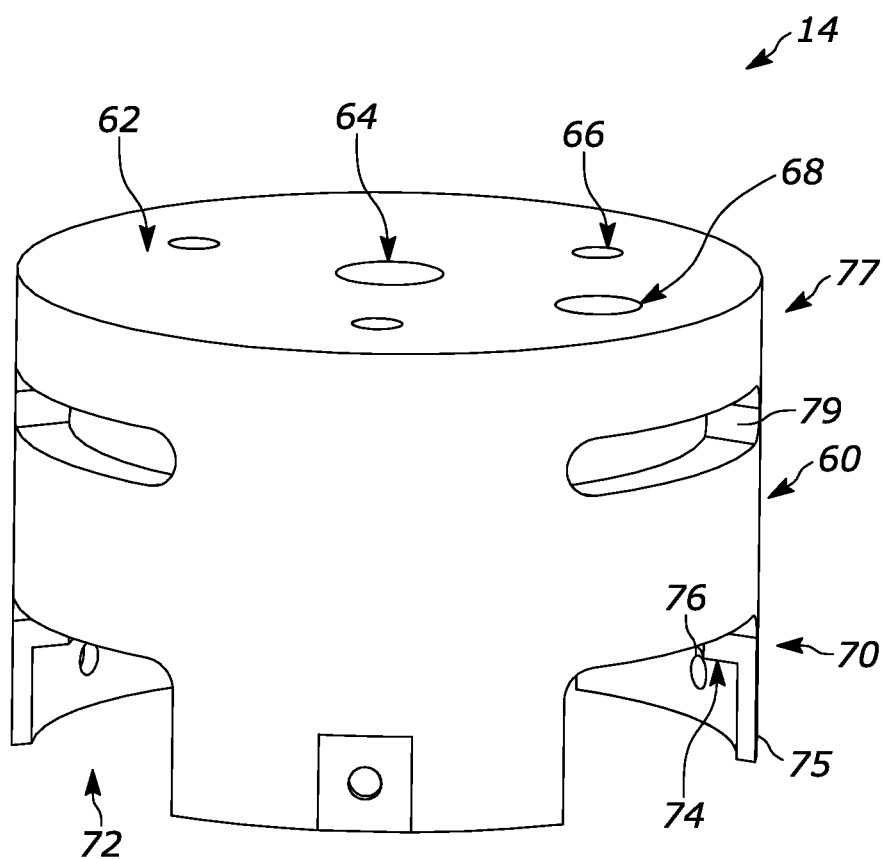
FIG. 9 of the drawings is a perspective view of the upper housing member of the cup sealing assembly of the present disclosure.
Figure 10:
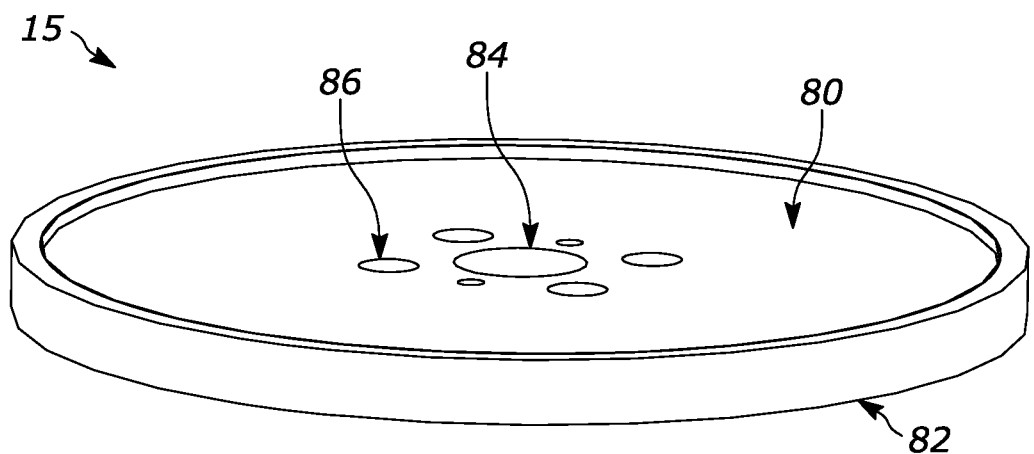
FIG. 10 of the drawings is a perspective view of the lower housing plate of the cup sealing assembly of the present disclosure.

With reference to FIGS. 3 and 4, each of the cup sealing assemblies 10 (i.e., at least one of the cup sealing assemblies, multiple ones of the cup sealing assemblies or all of the cup sealing assemblies) may comprise a lower housing member 12, an upper housing member 14, a lower housing plate 15, heating element 17 and sensor 18. Additionally, and as will be explained below, the upper and lower housing members may be coupled by side fasteners 110 and the heater plate may be coupled to the lower housing member through heater plate fasteners 112.

With reference to FIGS. 3, 4, 7 and 8, the lower housing member 12 is shown as comprising lower wall 20, central wall 22 and connector tube 24. In the configuration shown, the lower housing member 12 comprises a 304 stainless steel, while other materials are likewise contemplated. The lower wall 20 includes lower end 30, upper end 32, threaded bores 34, cooling slots 35, inner surface 36, and outer surface 38. The lower end 30 defines a lower edge 31 and the lower wall defines a cavity in cooperation with the central wall. The cooling slots are axially spaced apart about the lower wall between the upper end 32 and the lower end 30, and spaced apart from each other and extending from the inner surface 36 to the outer surface 38.

In the configuration shown, the cooling slots comprise elongated racetrack configurations having generally parallel sides the circularly configured ends, and that extend generally parallel to each other about the outer surface. There are six slots that are spaced apart from each other and generally parallel to each other, in a generally vertical orientation (i.e., generally perpendicular to the lower edge). Other configurations are contemplated, such as, for example, differently shaped openings (square, rectangular, circular, polygonal, arbitrary), a greater or fewer number of openings that may be spaced in different manners about the lower wall.

The threaded bores 34, in the configuration shown, comprise three transverse bores that extend through the outer surface proximate the upper end 32 of the lower wall 20. These threaded bores are disposed between alternate ones of the slots, between an upper end of the slot and the upper end 32 of the lower wall. These threaded bores are configured to receive side fasteners 110 so as to couple the upper housing member 14 to the lower housing member 12.

The central wall 22 is shown extending across the opening formed by the upper end 32 of the lower housing member. The central wall 22 is defined by top surface 40 and bottom surface 42. The central wall defines a generally circular configuration, with the lower wall 20 depending therefrom about an outer edge 43. A central opening 44 is positioned about a central axis of the lower housing member (which is generally cylindrical in the configuration shown). A plurality of fastener openings 46 surround the central openings 44. These fastener openings are configured to receive the heater plate fasteners 112. A sensor opening 48 is positioned axially between the central opening 44 and the outer edge 43 of the central wall 22.

The connector tube 24 is shown as comprising an elongated member having a lower end 50, an upper end 52 and defining a bore 54. The lower end 50 meets the top surface 40 of the central wall and extends generally vertically therefrom to the top end in a direction opposite the lower wall. The bore 54 comprises a generally uniform bore having a circular cross-sectional configuration generally matching the diameter of the central opening 44. The connector tube and the lower wall 20 are generally both of circular cross-sectional configuration and generally concentric relative to each other about an axis defined thereby.

With reference to FIGS. 3, 4, 7 and 9, the upper housing member 14 comprises upper wall 60 and upper transverse wall 62, defining upper cavity. As with the lower housing member, the upper housing member is likewise formed of a 304 stainless steel, while other materials are contemplated.

The upper wall 60 includes lower end 70 and upper end 77. The lower end 70 includes lower slots 72, lower flange 74, lower overhang portion 75. The slots are defined about the lower end, and axially spaced apart from each other therearound. In the configuration shown, a total of three equally spaced apart slots are defined in the lower end.

The lower flange 74 extends about the lower end being interrupted by the slots so as to form three separate segments. The flange extends across a portion of the thickness of the lower end, so as to define the lower overhang portion 75. The lower overhanging portion is likewise interrupted by the lower slots 72 so as to form three separate segments. Each segment includes openings 76 which are configured and positioned so as to correspond to the threaded bores 34 of the lower wall 20 of the lower housing member. The diameter of the upper housing member is such that the lower overhang portion 75 extends over the outer surface of the lower wall proximate the upper end thereof, with the lower flange 74 resting on the central wall 22 of the lower housing member 12.

The upper end 77 of the upper wall 60 includes a plurality of upper slots 79. In the configuration shown, three slots are formed that are generally parallel to and vertically spaced apart from the lower slots 72. In the configuration shown, the upper slots are equally spaced relative to each other, and may have an arcuate length that is approximately one sixth the circumference of the upper wall. The width of the upper slots is such that the distance between the lower slots and the upper slots is greater than the width of the upper slots. It will be understood that the shape and the configuration and the quantity can be varied and not limited to the configuration shown.

The upper transverse wall 62 spans across the upper end 77 of the upper wall 60. The upper transverse wall 62 comprises central opening 64, biasing openings 66 and sensor openings 68. The central opening corresponds to the central opening 44 of the lower housing member 12 and is sized so that the connector tube 24 can extend therethrough. The biasing openings 66 are disposed about the upper transverse wall 62. As noted above, the biasing openings 66 are configured to receive the fasteners 206 of the couplings 204. The sensor opening 68 corresponds to the sensor opening 48 of the central wall 22 of the lower housing member 12.

With reference to FIGS. 3, 4, 7 and 10, the lower housing plate 15 is shown as comprising top surface 80 and lower surface 82. The top surface 80 abuts the lower edge 31 of the lower wall of the lower housing member 12. A central opening 84 corresponds to the central opening 64 and the central opening 44. A plurality of fastener openings 94 are disposed through the lower housing plate 15. These fastener openings correspond to the fastener openings 46 of the central wall of the lower housing member. In the configuration shown, the lower housing plate comprises a generally circular member formed from a 304 stainless steel material. The outer edge may include an upwardly directed lip, which is configured to engage the outer surface 38 of the lower wall 20 of the lower housing member.

With reference to FIGS. 3, 4, 6 and 7, the heater plate 16 is defined by lower surface 90 and upper surface 92. The lower surface includes an outer rim 95 which is configured to engage the lid of the container to seal the lid to the cup. As such, the outer rim 95 comprises the desired configuration of the seal perimeter. The upper surface 92 includes a heating element groove 96 defined therein which is configured to receive the heating element therein so that the heating element can be captured within the heating element groove and the lower surface of the lower housing plate 15. In the configuration shown, the heating element groove comprises a spiral configuration that extends through a central region of the heater plate. A plurality of fastener openings 94 extend into the upper surface of the heater plate, which openings correspond to the fastener openings of the central wall and the lower housing plate, so as to receive the heater plate fasteners 112. In the configuration shown, the heater plate comprises a 440C stainless steel material, while other materials are likewise contemplated.

With reference to FIGS. 3, 4, 5 and 7, the heating element 17 comprises a lower coil 100 that shape matches the heating element groove 96 of the upper surface. An upper lead 102 extends from the lower coil in a configuration so as to extend through the connector tube 24 from the lower end 50 to the upper end 52. As can be seen, the cross-sectional configuration of the heating element is such that it can extend through the connector tube without hitting the sides thereof (i.e., the cross-sectional configuration of the heating element is smaller than that of the connector tube).

Figure 11:
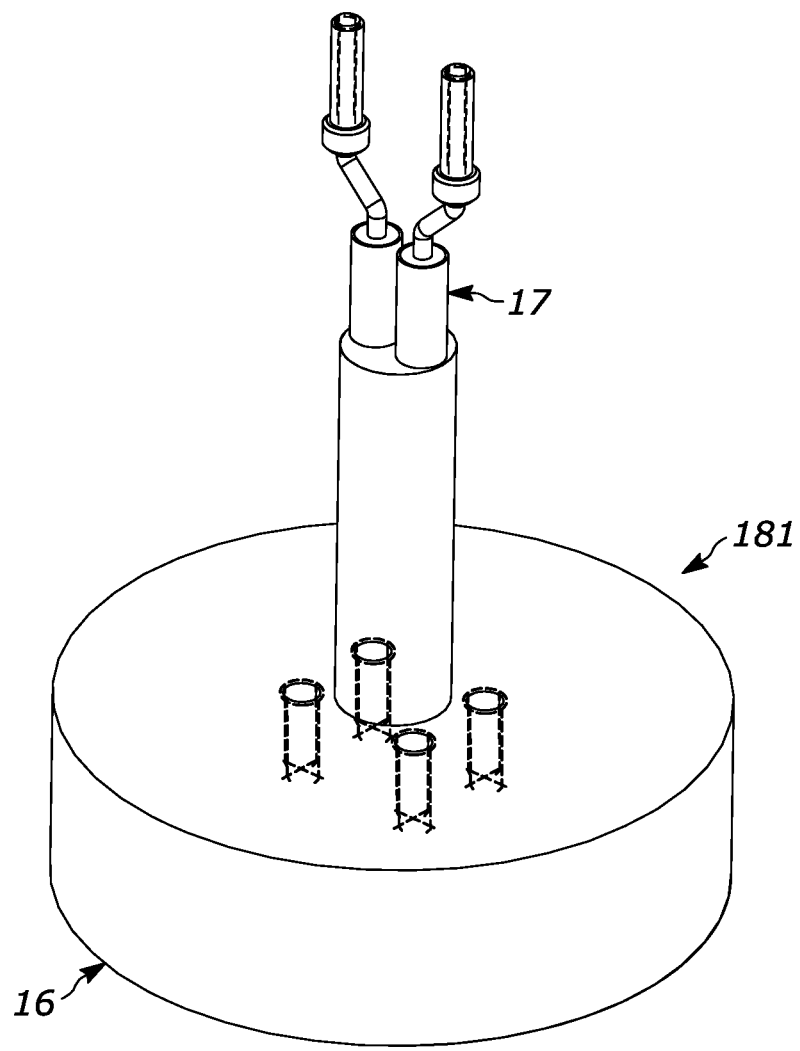
FIG. 11 of the drawings is a perspective view of a cast heater which unitizes the heater plate and the heating element into a single inseparable unit.

It will be understood that in other configurations, and with additional reference to FIG. 11, the heating element and the heater plate may be provided as a unit, such as with a cast heater 181 which combines the features. In such a configuration, the heating element is unitized with the heater plate into a single unit, and which is generally not separable (and purchased as a unit). Such a unit nevertheless includes the features of both the heating element and the heater plate. Of course, other variations are likewise contemplated.

With respect to FIGS. 3, 4, 5 and 7, the sensor 18 includes a coupling 104 at a first end which allows attachment to a control system or the like. The sensor 18 terminates at a sensor tip 106 which is in proximate the heating element (and may be in direct abutting engagement, or, may be very closely spaced apart from the heating elements).

The cup sealing assembly can be assembled in a number of different manners so that the lower coil 100 of the heating element 17 is placed into the heating element groove 96 of the heater plate. Once positioned, the lower housing plate 15 can be positioned over the upper surface of the heater plate 16. The upper lead 102 is extended through the central opening 87 of the housing plate. Additionally, the fastener openings 86 and 94 are aligned.

Next, the lower housing member is provided and positioned so that the lower edge 31 abuts the top surface 80 of the lower housing plate. At the same time, the upper lead 102 extends through the central opening 44 and through the bore 54 of the connector tube. The fastener openings 46 are aligned with the fastener openings 86 and 94, at which time the heater plate fasteners 112 can be extended through the fastener openings, and coupled to the fastener openings 94 (which, in the configuration shown, are threaded).

The upper housing member 14 can be installed and interfaced with the lower housing member 12. In particular, the upper housing member is configured so that the connector tube 24 extends through the central opening 64. The upper housing member is directed at the lower housing member and the lower flange 74 engages and rests on the top surface 40 of the central wall. At the same time, the lower overhang portion 75 extends over the outer surface of the lower wall. The two can be rotated relative to each other so that the openings 76 align with the threaded bores 34, and so that the sensor opening 68 aligns with the sensor opening 48. The side fasteners 110 can be directed through the openings 76 and threaded into the threaded bores 34.

The sensor can be introduced through the sensor openings in each of the upper housing member, the lower housing member and abuttingly engages the upper surface 92 of the lower housing plate. The sensor may be spring loaded so that there can be a level of compliance as the different elements expand and contract due to forces and/or thermal effects.

Multiple such cup sealing assemblies 10 can be coupled to housing 202 of assembly 200. In the configuration shown, eight cup sealing assemblies can be coupled to the housing 202.

It will be understood that the outer rim 95 of the heater plate conforms to the shape of the seal that is formed to attach the lid to the cup. In the configuration shown, the outer rim is substantially circular is shape. The upper and lower housing members as well as the lower housing plate are likewise substantially circular in cross-sectional configuration and substantially match the shape of the outer rim of the heater plate.

In other configurations, the outer rim 95 of the heater plate may be of a configuration that is other than circular, including, but not limited to, oval, elliptical, polygonal, rectangular, square, as well as other non-uniform geometric configurations. Additionally, in such configurations, the cross-sectional configuration the lower housing member and the upper housing member may be of a shape that substantially matches the configuration of the outer rim. In other configurations, the shapes of the upper and lower housing members may be different than that of the lower housing plate and the heater plate, or just the heater plate.

In operation, it will be understood that the cup sealing assemblies are configured to move relative to a cup and lid so as to apply a force on a lid to direct the lid into the upper rim of a cup and heat the lid and the cup so as to heat seal the lid onto the cup. This cycle is repeated over and over again to seal subsequent cups to lids. Typically, the force that is applied is on the order of 80 pounds per square inch (while other forces are likewise contemplated).

Advantageously, the configuration of the present cup sealing assembly is configured to minimize the transfer of heat from the heating element 17 to the upper housing member and to the fasteners 206, the springs 208 and the housing 202. Among other features, the cooling slots 35 allow for that outward radiation of heat from the heater plate and the lower housing plate. The heater plate 16 is coupled to the lower housing member through the heater plate fasteners, which are spaced apart from the upper housing member. Further the cooperation between the lower slots 72 and the upper slots 79 provide a chimney effect. That is, the configuration is such that outside air enters through the lower slots and exits through the upper slots, further cooling the cup sealing assembly. To provide robustness, the upper housing member rests on the lower housing member about lower flange 74, and the fasteners generally provide alignment and retention, but are generally not subjected to excessive shear loads due to the force being transmitted through the lower flange and the top surface of the central wall.

It is desirable to increase the throughput of the filling and sealing packaging equipment. For example, it is desirable to achieve 60 cycles per minute (although a greater or lesser number of cycles is contemplated). To further improve throughput, temperatures in excess of 350° F. is desired, and many solutions are not capable of continuous temperatures at the forces described herein. It is contemplated that the cup sealing assembly of the present disclosure is configured for use in environments wherein temperatures exceed 350° F., and preferably in excess of 400° F., and preferably in excess of 450° F., and preferably at temperatures that are continuously around 600° F. The structural features of the cup sealing assembly 10 facilitates operation at such forces and temperatures. Additionally, the materials can be selected so that the materials maintain adequate strength at such temperatures and with such forces being exerted thereagainst.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A cup sealing assembly comprising:
a lower housing member, the lower housing member comprising a lower wall defining a cavity, with a plurality of cooling slots extending through the lower wall providing ingress into the cavity, the lower wall having a lower end and an upper end, with a central wall extending across the upper end of the central wall and having a central opening;
upper housing member comprising upper wall including an upper end, and a lower end, an upper transverse wall extending across the upper end of the upper wall, with a lower flange defined at the lower end, the lower flange overlying the central wall, and a lower overhang portion overlying a portion of an outer surface of the lower wall;
a heater plate extending across the lower end of the lower housing member, the heater plate having an upper surface and a lower surface with an outer rim, the outer rim configured to form a seal between a lid and a cup of a container; and
a heating element comprising a lower coil engaging the upper surface of the heater plate.

2. The cup sealing assembly of claim 1 wherein the upper wall of the upper housing member having a plurality of lower slots and upper slots spaced apart and above the lower slots.

3. The cup sealing assembly of claim 2 wherein the plurality of lower slots are formed into the lower flange and lower overhang portion.

4. The cup sealing assembly of claim 3 wherein the lower slots and the upper slots each comprise three lower slots and three upper slots that correspond to the three lower slots.

5. The cup sealing assembly of claim 4 wherein the upper and lower slots of the upper housing member are substantially horizontal with the cooling slots being substantially vertical.

6. The cup sealing assembly of claim 1 further comprising at least one opening extending through the lower overhang portion, with at least one corresponding threaded bore extending in the lower wall of the lower housing member, and, a fastener extending through the opening and into the corresponding threaded bore.

7. The cup sealing assembly of claim 1 further comprising at least one fastener that joins the central wall of the lower housing member to the heater plate.

8. The cup sealing assembly of claim 7 wherein the lower housing member further includes a connector tube extending from the central wall opposite the lower wall.

9. The cup sealing assembly of claim 8 wherein the heating element extends through the connector tube.

10. The cup sealing assembly of claim 1 further comprising a sensor extending through the upper transverse wall and the central wall and including a sensor tip proximate the heater plate.

11. The cup sealing assembly of claim 1 wherein the heater plate and the heating element are unitized.

12. A cup sealing assembly comprising:
a lower housing member having a lower wall having a lower end and an upper end, with a central wall extending across the upper end of the lower wall defining a cavity, at least one cooling slot defined in the lower wall providing ingress into the cavity;
an upper housing member having an upper wall and an upper transverse wall, the upper wall having a lower end positioned on the central wall, defining an upper cavity, at least one pair of cooling slots defined in the upper wall the pair of cooling slots being spaced apart from each other in a vertical orientation;
a lower housing plate positioned at the lower end of the lower housing member;
a heater plate having an upper surface and a lower surface, with an outer rim extending from the lower surface;
a heating element comprising a lower coil sandwiched between the upper surface of the heater plate and the lower surface of the lower housing plate; and
at least one heater plate fastener coupling the lower housing member to the heater plate, and extending through the lower housing plate.

13. The cup sealing assembly of claim 12 wherein:
the central wall includes a central opening, the upper transverse wall includes a central opening and the lower housing plate includes a central opening, with a portion of the heating element extending through the central opening of the central wall, the central opening of the upper transverse wall and the central opening of the lower housing plate.

14. The cup sealing assembly of claim 13 wherein the lower housing member includes a connector tube extending from the central opening of the central wall and through the central opening of the upper transverse wall.

15. The cup sealing assembly of claim 12 wherein the lower end of the upper wall includes a lower flange engaging the central wall, with an overhanging portion extending over a portion of an outer surface of the lower housing member.

16. The cup sealing assembly of claim 15 further comprising a fastener extending through the overhanging portion of the upper wall and into the lower housing member, to, in turn, couple the upper housing member to the lower housing member.

17. The cup sealing assembly of claim 12 further comprising a sensor having a sensor tip interfacing with a top surface of the lower housing plate.

18. The cup sealing assembly of claim 12 wherein the upper surface of the heater plate includes a heating element groove defined therein, with the heating element including a lower coil configured to be positioned within the heating element groove.

19. The cup sealing assembly of claim 12 wherein the lower housing member comprises a plurality of vertically oriented slots spaced apart from each other about the lower wall, and, the plurality of vertically oriented of slots extending through the upper wall comprises a plurality of pairs of vertically oriented slots extending through the upper wall, each of the plurality of pairs of vertically oriented slots having an elongated horizontally oriented slot.

20. The cup sealing assembly of claim 12 further comprising at least one fastener coupled to the upper transverse wall with a spring captured between the at least one fastener and the upper transverse wall.

21. The cup sealing assembly of claim 12 wherein the lower housing plate, the upper housing member and the lower housing member comprises a 304 stainless steel material, and the heater plate comprises a 404c stainless steel material.

22. A packaging machine cup and lid sealing assembly comprising:
  a housing;
  a plurality of cup sealing assemblies, each of the plurality of cup sealing assemblies being attached to the housing through a coupling, the coupling comprising at least one fastener, with a spring biasing the cup sealing assembly relative to the housing and the at least one fastener, at least one of the plurality of cup sealing assemblies comprising:
    a lower housing member having a lower wall having a lower end and an upper end, with a central wall extending across the upper end of the lower wall defining a cavity, at least one cooling slot defined in the lower wall providing ingress into the cavity;
    an upper housing member having an upper wall and an upper transverse wall, the upper wall having a lower end positioned on the central wall, defining an upper cavity, at least one pair of cooling slots defined in the upper wall the pair of cooling slots being spaced apart from each other in a vertical orientation;
    a lower housing plate positioned at the lower end of the lower housing member;
    a heater plate having an upper surface and a lower surface, with an outer rim extending from the lower surface;
    a heating element comprising a lower coil sandwiched between the upper surface of the heater plate and the lower surface of the lower housing plate; and
    at least one heater plate fastener coupling the lower housing member to the heater plate, and extending through the lower housing plate.

* * * * *